United States Patent [19]
Isshiki et al.

[11] Patent Number: 5,010,739
[45] Date of Patent: Apr. 30, 1991

[54] AIR CONDITIONING APPARATUS HAVING AUDIBLE SOUND LEVEL CONTROL FUNCTION

[75] Inventors: Masao Isshiki, Shizuoka; Takeshi Kumazawa, Tokyo, both of Japan

[73] Assignee: Kabushiki Kaisha Toshiba, Kanagawa, Japan

[21] Appl. No.: 538,257

[22] Filed: Jun. 14, 1990

[30] Foreign Application Priority Data

Jun. 30, 1989 [JP] Japan .................................. 1-169660
Jul. 26, 1989 [JP] Japan .................................. 1-191274

[51] Int. Cl.$^5$ ............................................. G05D 23/32
[52] U.S. Cl. ........................................ 62/158; 62/296; 181/175; 417/14

[58] Field of Search ...................... 62/158, 180, 228.4, 62/296; 417/14; 181/175

[56] References Cited

FOREIGN PATENT DOCUMENTS

| 0105580 | 7/1982 | Japan | 417/14 |
|---|---|---|---|
| 60-4741 | 1/1985 | Japan . | |
| 0272483 | 12/1986 | Japan | 62/228.4 |

*Primary Examiner*—William E. Wayner
*Attorney, Agent, or Firm*—Helfgott & Karas

[57] ABSTRACT

An audible sound radiated from an air conditioning apparatus is decreased when the actual audible sound detected by the sound sensor is greater than a predetermined audible sound value which is modified according to changes in the ambient light or the ambient temperature.

12 Claims, 11 Drawing Sheets

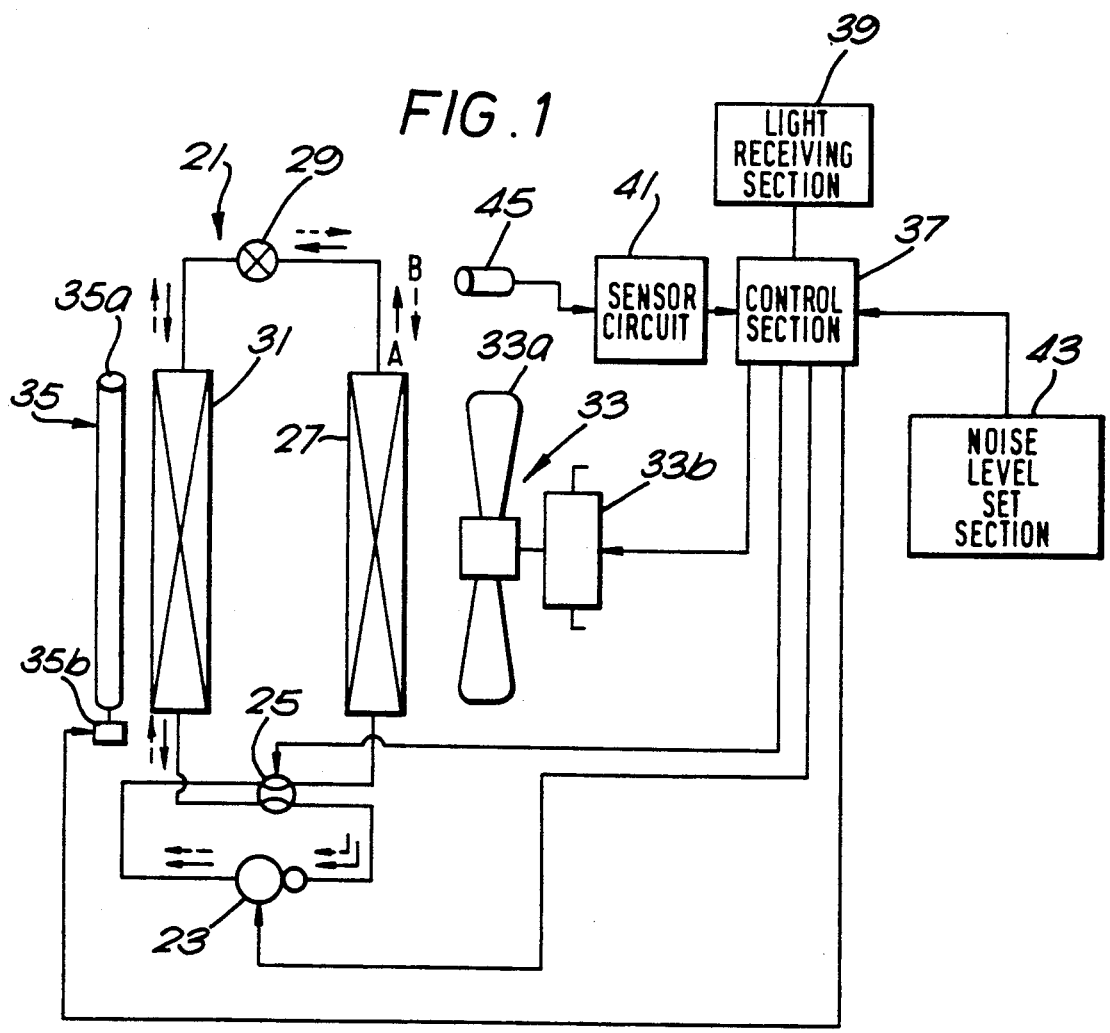

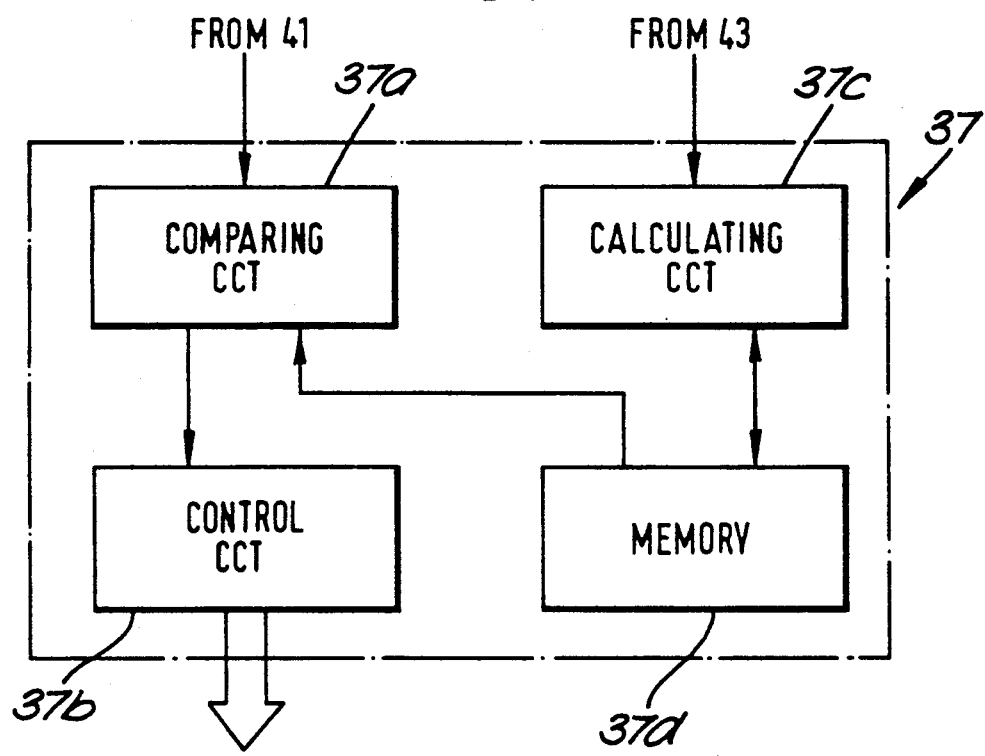
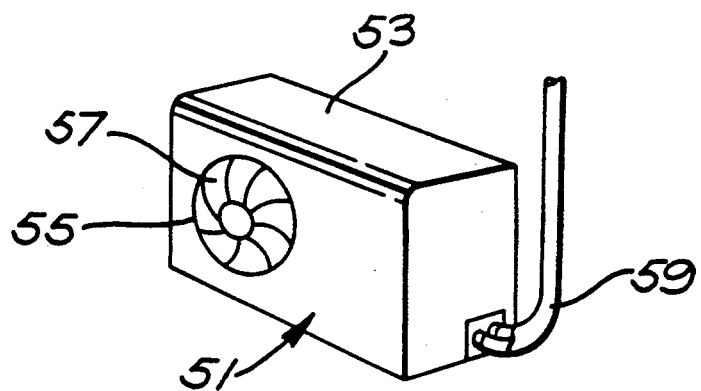

AIR CONDITIONING APPARATUS HAVING AUDIBLE SOUND LEVEL CONTROL FUNCTION

BACKGROUND OF THE INVENTION

1. Field of the invention

The invention relates, in general, to air conditioning apparatus. In particular, the invention relates to a split-type air conditioning apparatus including a refrigerating circuit unit (external unit) installed outside a house and an air conditioning unit (internal unit) arranged inside the house.

2. Description of the related art

In the past, key factors considered in the design of air conditioning apparatus have been energy savings, comfortable performance, and ease of operation. In recent years, the audible sound generated from the air conditioning apparatus has been focused on as one of the factors adversely affecting the performance of the apparatus in terms of environmental quarity.

Japanese Laid-open patent 60-4741 discloses an air conditioning apparatus which controls the level of the audible sound generated by the air conditioning unit arranged inside the room. In this conventional air conditioning apparatus, a microphone is arranged in the air conditioning unit to detect audible sound in the room. The actual audible sound in the room is detected while the air conditioning apparatus operates. The actual audible sound is the total sound value of both the audible sound radiated from the air conditioning unit when the air conditioning apparatus operates and the background audible sound, which is the noise value in the room when the air conditioning apparatus stops. In the conventional air conditioning apparatus, an estimated background audible sound value is calculated by a specific equation based on the actual audible sound value detected by the microphone during the operation of the air conditioning unit. If the estimated background audible sound value is greater than a preset background audible sound value, the rotational speed of an internal fan device arranged in the air conditioning unit is decreased by a prescribed value to reduce the level of the audible sound radiated from the air conditioning unit.

In the above-described conventional air conditioning apparatus, the actual audible sound value during the operation of the air conditioning apparatus can be reduced. However, since the preset background audible sound value is constant, it is difficult to control the actual audible sound value in response to changes in the level of the background audible sound in the room, e.g., daytime, nighttime, etc.

In addition, in the conventional air conditioning apparatus, the control of audible sound radiated from the refrigerating circuit unit, which is arranged outside the house, is not considered. However, the audible sound radiated from the refrigerating circuit unit becomes an environment problem in an area crowded with many houses or apartments.

SUMMARY OF THE INVENTION

Accordingly, it is an object of the present invention to effectively control the level of the audible sound generated by an air conditioning apparatus in response to changes in the level of the background audible sound.

It is another object of the invention to provide an improved air conditioning apparatus which modifies a predetermined sound value in response to the external temperature.

It is still another object of the invention to provide an improved air conditioning apparatus which modifies a predetermined sound value in response to the external light level.

To accomplish the above-described objects, an air conditioning apparatus includes a refrigerating circuit unit having a compressor and an external fan device for performing a refrigerating cycle operation and an air conditioning unit having an internal fan device for circulating conditioned air in a closed space. The air conditioning apparatus also includes a sound sensor for detecting an actual audible sound value (Na) including the audible sound value from the air conditioning appratus while the air conditioning apparatus is operated and a background audible sound value (Nb) which is a sound value while the air conditioning apparatus is stopped, a memory for previously storing a predetermined audible sound value (Ns), a modifying section for modifying the predetermined audible sound value to output a modified audible sound value (Ns'), a comparing section for comparing the actual audible sound value (Na) with one of the predetermined audible sound value (Ns) and the modified audible sound value (Ns'), and a control section for reducing the level of the audible sound from the air conditioning apparatus when the actual audible sound value is greater than one of the predetermined audible sound value and the modified audible sound value.

The control section may include a first control circuit for decreasing the rotational speed of at least either the compressor or the external fan device in response to the comparing section to reduce the audible sound from the refrigerating circuit unit. The control section may also include a second control circuit for decreasing the rotational speed of the internal fan device in response to the comparing section to reduce the audible sound from the air conditioning unit.

The modifying section may includes a photo-sensor for detecting changes in the ambient light at the location of the refrigerating circuit unit. The predetermined audible sound value may be modified in response to the output of the photo-sensor. The modifying section may also include a temperature sensor for detecting changes in the ambient temperature at the location of the refrigerating circuit unit. The predetermined audible sound value may be modified in response to the output of the temperature sensor.

BRIEF DESCRIPTION OF THE DRAWINGS

These and other objects and advantages of this invention will become apparent from the following detailed description of the presently preferred embodiment of the invention, taken in conjunction with the accompanying drawings of which:

FIG. 1 is a circuit diagram of air conditioning apparatus according to one embodiment of the present invention;

FIG. 2 is a block diagram of the control section shown in FIG. 1;

FIG. 3 is a perspective diagram illustrating an external view of a refrigerating circuit unit of one embodiment;

DETAILED DESCRIPTION OF THE PREFERRED EMBODIMENTS

Figure 4:
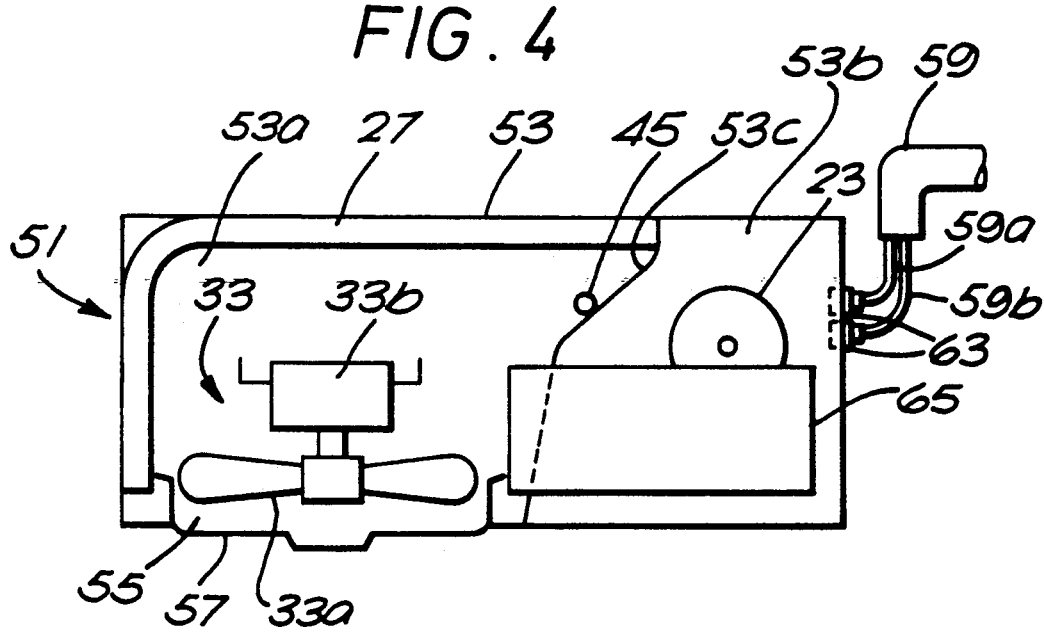
FIG. 4 is a schematic plan view of the internal arrangment of the refrigerating circuit unit.

Preferred embodiments of the present invention will now be described with reference to the accompanying drawings. As shown in FIG. 1, an air conditioning apparatus 21 includes a compressor 23, a four-way valve 25, an external heat-exchanger 27, an expansion valve 29 and an internal heat-exchanger 31. The output port of compressor 23 is connected to the input side of external heat-exchanger 27 through four-way valve 25. The output side of heat-exchanger 27 is connected to the input port of compressor 23 through expansion valve 29, internal heat-exchanger 31, and four-way valve 25 connected in series to form a refrigerating circuit. An external fan device 33 including a fan 33a and a fan motor 33b and an internal fan device 35 composed of a fan 35a and a fan motor 35b are individually disposed close to the corresponding heat-exchangers 27 and 31. In the cooling mode, refrigerant in the above-described refrigerating circuit circulates through each element described above in the direction indicated by an arrow A in FIG. 1. In this operation mode, external heat-exchanger 27 acts as a condenser, and internal heat-exchanger 31 acts as an evaporator. In the heating mode, four-way valve 25 is changed, and therefore, the flow direction of refrigerant is changed, as indicated by an arrow B. At this time, internal heat-exchanger 31 serves as a condenser, and external heat-exchanger 27 serves as an evaporator.

Compressor 23, four-way valve 25, and fan motors 33b and 35b are electrically connected to control section 37. A light receiving section 39, a sensor circuit 41, and a noise level set section 43 are also connected to control section 37. Light receiving section 39 receives light radiated from a remote controller (not shown) and transmits input data fed from the remote controller to control section 37. Sensor circuit 41 receives a sound signal from a sound sensor 45 and sends the signal to control section 37, as detected sound value data, after amplifying the sound signal. A microphone which converts a sound pressure into an electric signal or a photo-microphone which converts a sound pressure into a photo-signal is suitable for sound sensor 45.

As shown in FIG. 2, control section 37 includes a comparing circuit 37a, a control circuit 37b, a calculating circuit 37c and a memory 37d. When sound sensor 45 detects the actual audible sound during the operation of the air conditioning apparatus 21, the sound signal from sound sensor 45 is input into comparing circuit 37a through sensor circuit 41, as an actual sound value data. Comparing circuit 37a compares actual audible sound value (Na) with a prescribed sound value (Ns) stored in memory 37d. If actual audible sound value (Na) is greater than prescribed sound value (Ns), control circuit 37b controls the rotational speed of external fan device 33, internal fan device 35 or compressor 23 based on the comparison results.

Control section 37 may be comprised of a microcomputer and its peripheral circuit to control the entire operation of air conditioning apparatus 21.

In this embodiment, a user or an occupant can change the prescribed sound value (Ns) to a modified sound value (Ns') through noise level set section 43. Noise level set section 43 includes a set switch (not shown) to command the change of the prescribed sound value (Ns) to control section 37. Thus, if the set switch of noise level set section 43 is operated, a predetermined sound level modifying value α is added to the background audible sound value (Nb) in calculating circuit 37c to output modified sound value (Ns'), and modified sound value (Ns') is stored in memory 37d.

Figure 5:
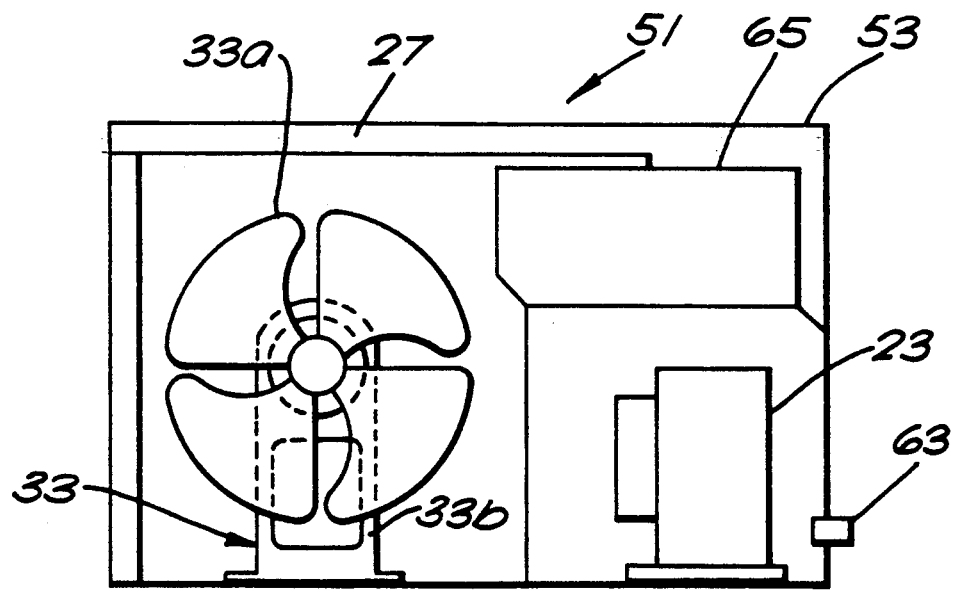
FIG. 5 is a schematic side view illustrating the internal arrangement of the refrigerating circuit unit shown in FIG. 4.

A refrigerating circuit unit will now be described with reference to FIGS. 3, 4 and 5. A refrigerating circuit unit 51 includes compressor 23, four-way valve 25, external heat-exchanger 27, expansion valve 29 and external fan device 33. Refrigerating circuit unit 51 also includes sound sensor 45. All of the elements of refrigerating circuit unit 51 are housed in an external housing 53, as shown in FIG. 3. An air-intake opening 55 formed in a front side plate of external housing 53 is covered with a wired guard 57. A conventional pipe unit 59 extends from the lower portion of the side plate of external housing 53 to an air conditioning unit (not shown), which is installed inside the house. As shown in FIGS. 4 and 5, the interior of external housing 53 is divided into an air flow chamber 53a and a component chamber 53b by a partition plate 53c. External heat-exchanger 27 and external fan device 33 are arranged in air flow chamber 53a, and compressor 23 is disposed in component chamber 53b. The input and output ports of compressor 23 are respectively connected to a pair of refrigerant pipes 59a and 59b through a pair of valves 63. An element box 65 wherein control section 37 and sensor circuit 41 are housed is arranged in component chamber 53b. Sound sensor 45 is attached to the surface of partition plate 53c exposed to air flow chamber 53a.

Figure 6:
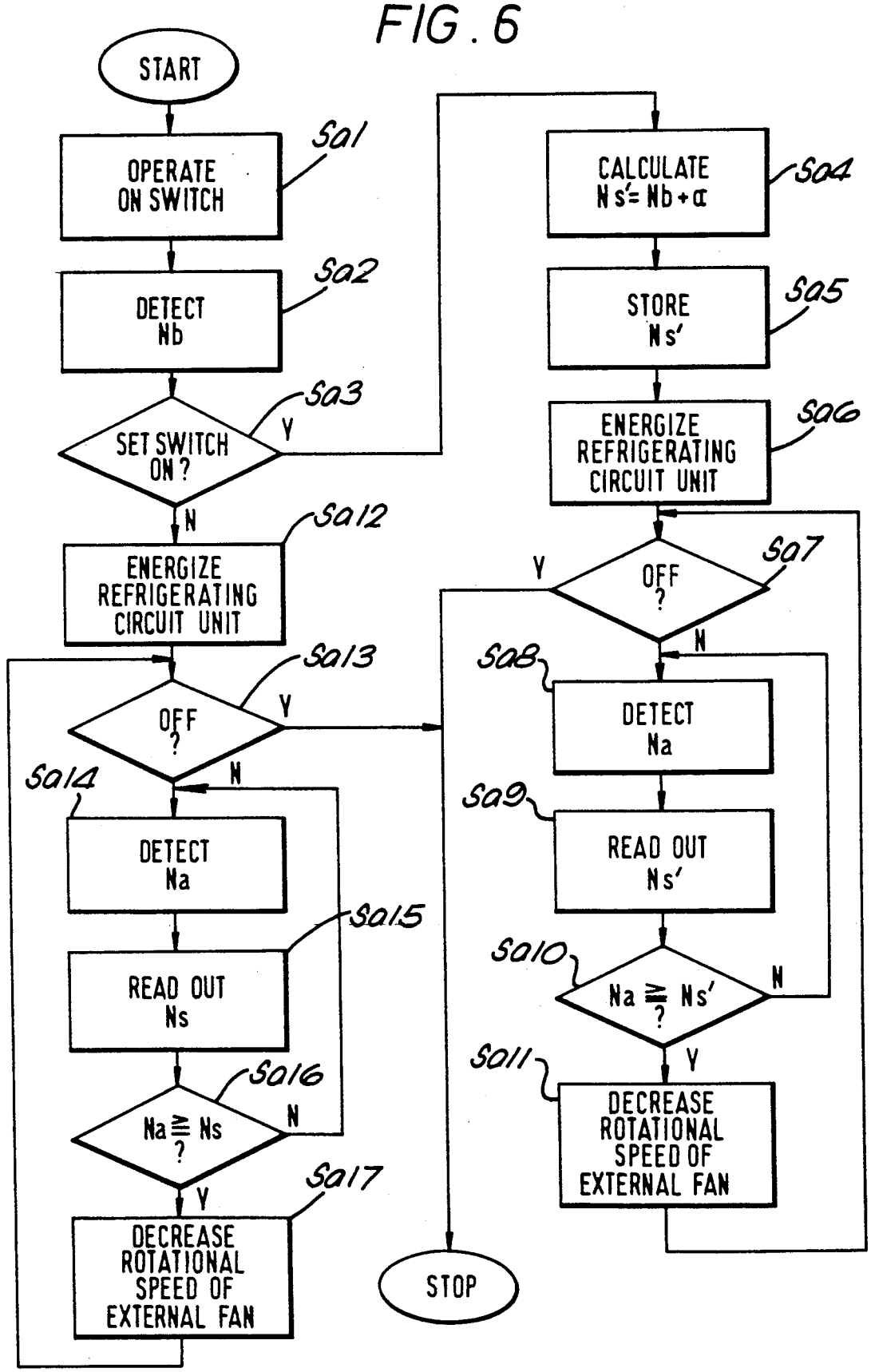
FIG. 6 is a flow chart of an audible sound level control operation of the air conditioning apparatus shown in FIG. 1.

The audible sound level control operation of the above-described air conditioning apparatus 21 will now be described with reference to FIG. 6. The set switch of noise level set section 43 is operated before an ON switch (not shown) arranged in the remote controller is operated if the occupant wants the execution of the audible sound level control operation by air conditioning apparatus 21 (step Sa1). Before refrigerating circuit unit 51 is energized, sound sensor 45 detects the background audible sound value (Nb) where refrigerating circuit unit 51 is positioned (Sa2). In step Sa3, if the set switch of noise level set section 48 bas been set, the YES-path is taken. Otherwise, the NO-path is taken. If the YES-path is taken in step Sa3, a predetermined sound level modifying value α is added to the value of the background audible sound (Nb), as a modified sound value (Ns') (step Sa4). The modified sound value (Ns) is stored in memory 37d (step Sa5). Then, refrigerating circuit unit 51 is energized by control section 37 (step Sa6). In step Sa7, if an OFF switch (not shown) arranged in the remote controller is operated, the YES-path is taken, and the operation of air conditioning apparatus 21 is stopped. Otherwise, the NO-path is taken. In step Sa8, the actual audible sound value (Na) is detected by sound sensor 45, and is fed to control section 37 through sensor circuit 41. In step Sa9, the modified sound value (Ns') is read out from memory 37d. In step Sa10, the actual audible sound value (Na) is compared with the modified sound value (Ns') by comparing circuit 37a. If the actual audible sound value (Na) is equal to or greater than the modified sound value (Ns'), the YES-path is taken. The rotational speed of external fan device 33 is decreased by a prescribed value R (step Sa11), and the above-described step Sa7 is re-executed. If the actual audible sound value (Na) is smaller than the modified sound value (Ns'), the NO-path is taken, and the above-described steps Sa8, Sa9, Sa10 are re-executed.

In step Sa3, if the set switch of noise level set section 43 was not Operated, the NO-path is taken, and refrigerating circuit unit 51 is energized by control section 37 (step Sa12). In step Sa13, if the OFF switch arranged in the remote controller is operated, the YES-path is taken and the operation of air conditioning apparatus 21 is stopped. Otherwise, the NO-path is taken. In step Sa14, the actual audible sound value (Na) is detected by sound sensor 45 and is fed to control section 37 through sensor circuit 41. In step Sa15, a predetermined sound value (Ns) is read out from memory 37d. In step Sa16, the actual audible sound value (Na) is compared with the predetermined sound value (Ns) by comparing circuit 37a. If the actual audible sound value (Na) is equal to or greater than the predetermined sound value (Ns), the YES-path is taken. The rotational speed of external fan device 33 is decreased by the prescribed value R (step Sa17), and the above-described step Sa13 is re-executed. If the actual audible sound value (Na) is smaller than the predetermined sound value (Ns), the NO-path is taken, and the above-described steps Sa14, Sa15 and Sa16 are re-executed.

With the above-described embodiment, since the audible sound value is determined by modifying the background audible sound value (Nb) which is detected by sound sensor 45 before the air conditioning apparatus 21 operates, a suitable audible sound level control can be carried out in response to changes in the environment condition where refrigerating circuit unit 51 is located.

In the above-described embodiment, the rotational speed of external fan device 33 is decreased when the actual audible sound value (Na) is greater than either the predetermined sound value (Ns) or the modified sound value (Ns'). However, the rotational speed of compressor 23 may be decreased instead of that of external fan device 33, or the rotational speed of both compressor 23 and external fan device 33 may be decreased. Sound sensor 45 is attached to the surface of partition plate 53c exposed to air flow chamber 53a. However, sound sensor 45 may be attached to other portions in housing 53.

Figure 7:
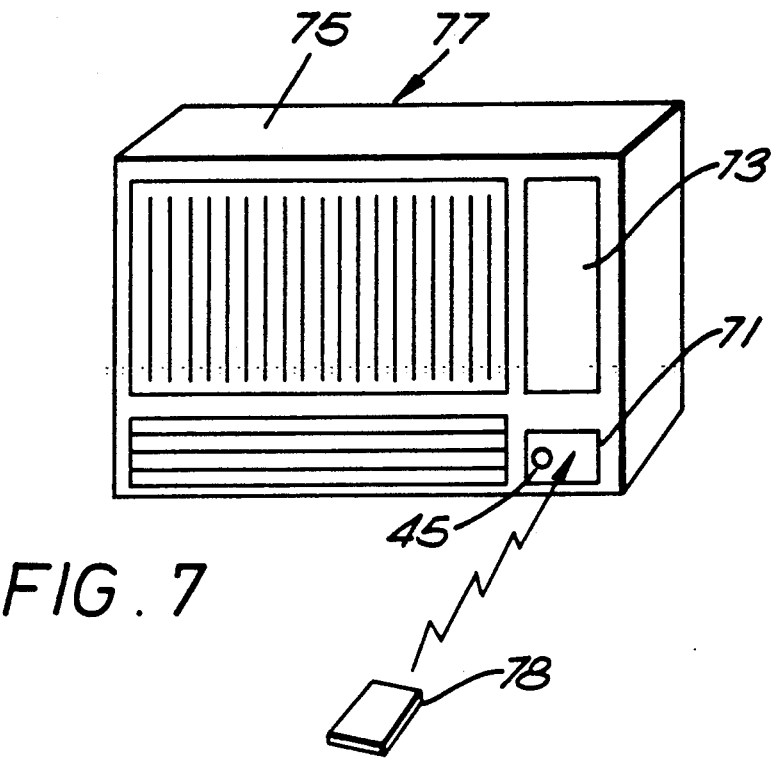
FIG. 7 is a perspective view of the air conditioning unit of an air conditioning apparatus of a second embodiment of the present invention.
Figure 8:
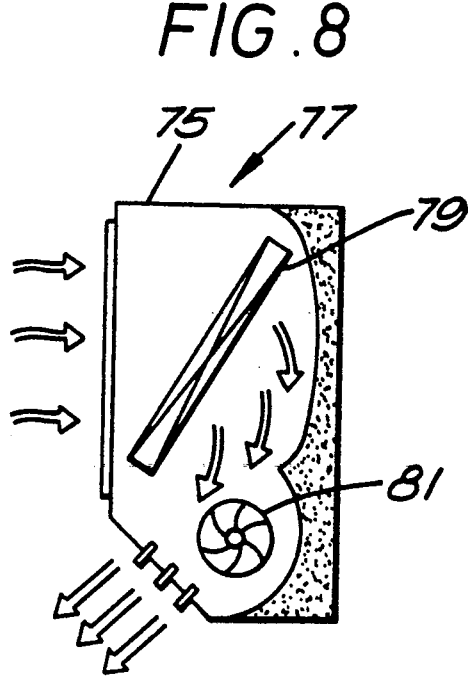
FIG. 8 is a cross sectional side view of the air conditioning unit shown in FIG. 7.

A second embodiment of the present invention will now be described with reference to FIGS. 7 and 8. In this embodiment, sound sensor 45 is attached to a light receiving panel 71 formed in the front panel 73 of an internal housing 75 of an air conditioning unit 77, as shown in FIG. 7. Sound sensor 45 detects the audible sound value in the room. Light receiving panel 71 receives light emitted from a remote controller 78 used to control the air conditioning apparatus. Air conditioning unit 77 includes an internal heat-exchanger 79, and an internal fan device 81, as shown in FIG. 8. The arrangement of refrigerating circuit unit 77 in the second embodiment is similar to that of the first embodiment. The background audible sound value (Nb) in the room where air conditioning unit 77 is located is detected by sound sensor 45. The prescribed modifying value $a$ is added to the predetermined audible sound value (Ns) to output a modified audible sound value (Ns'). The audible sound level control operation of the second embodiment also is similar to that of the first embodiment. Thus, the detailed operation of the second embodiment is not repeated. However, in this embodiment, if the actual audible sound value (Na) in the room detected by sound sensor 45 is greater than either the predetermined sound value (Ns) or the modified sound value (Ns'), the rotational speed of internal fan device 81 is decreased by a prescribed value R'. This decreasing operation to the rotational speed of internal fan device 8 is carried Out until the actual audible sound value (Na) is smaller than either the predetermined sound value (Ns) or the modified sound value (Ns'). Thus, the actual audible sound value (Na) in the room can be reduced. Similar effects to the first embodiment can be achieved in the second embodiment.

Figure 9:
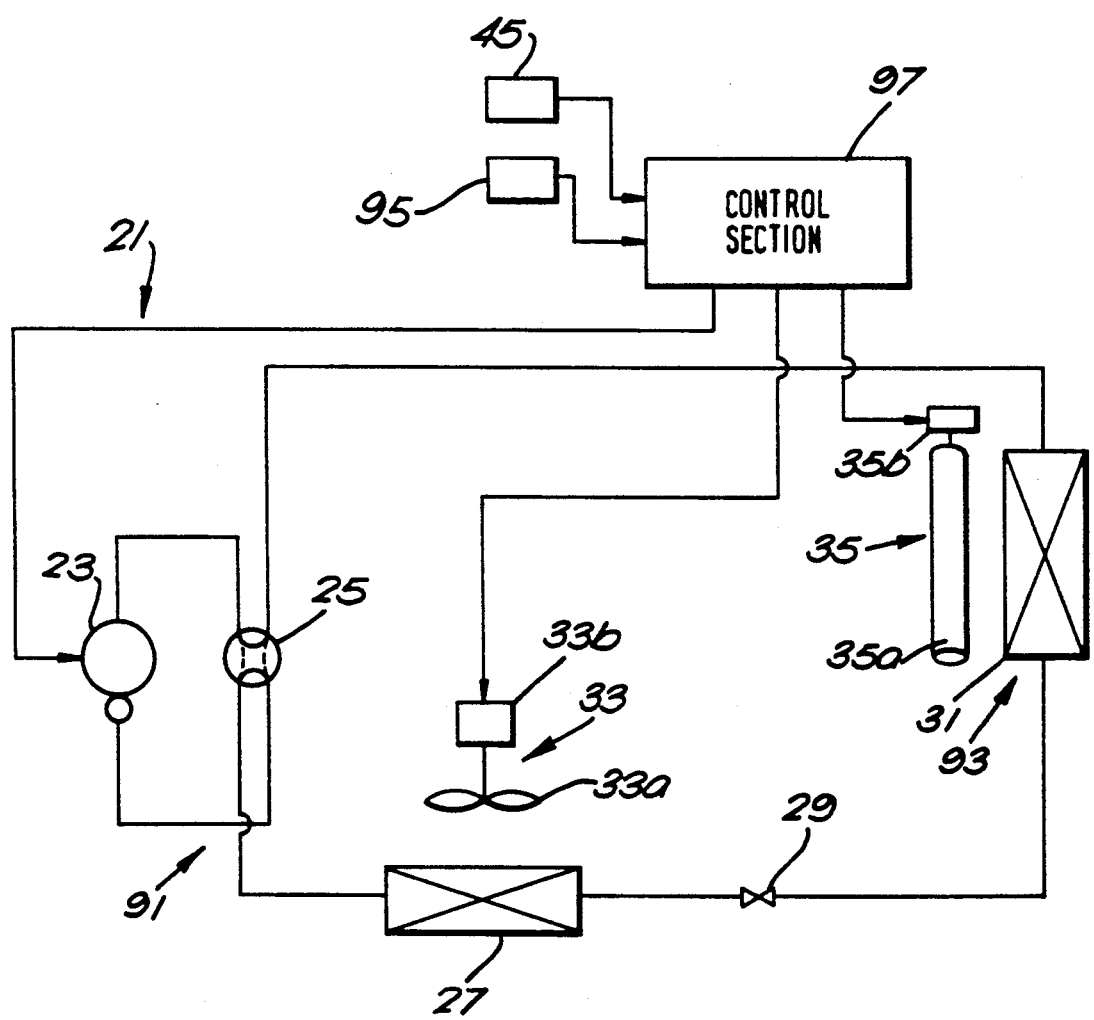
FIG. 9 is a circuit diagram of air conditioning apparatus of a third embodiment of the present invention.

A third embodiment of the present invention will now be described with reference to FIGS. 9, 10 and 11. An air conditioning unit and a refrigerating circuit unit of this embodiment are similar to those of the first embodiment shown in FIG. 1. In the drawings, the same numerals are applied to the same element, and therefore, the detailed descriptions thereof are not repeated. In this embodiment, a refrigerating circuit 91 including compressor 23, four-way valve 25, external-heat exchanger 27, expansion valve 29 and external fan device 33 is installed outside the house. An air conditioning unit 93 including internal heat-exchanger 31 and internal fan device 35 is arranged inside the house. Sound sensor 45 is arranged in refrigerating circuit unit 91 to regularly detect the actual audible sound value (Na) at the outside of the house while refrigerating circuit unit 91 operates. A photo-sensor 95 is also arranged at refrigerating circuit unit 91 to detect changes in light at the outside of the housing. Thus, daytime or nighttime is detected by photo-sensor 95. The detection results from sound sensor 45 and photo-sensor 95 are supplied to a control section 97.

Figure 10:
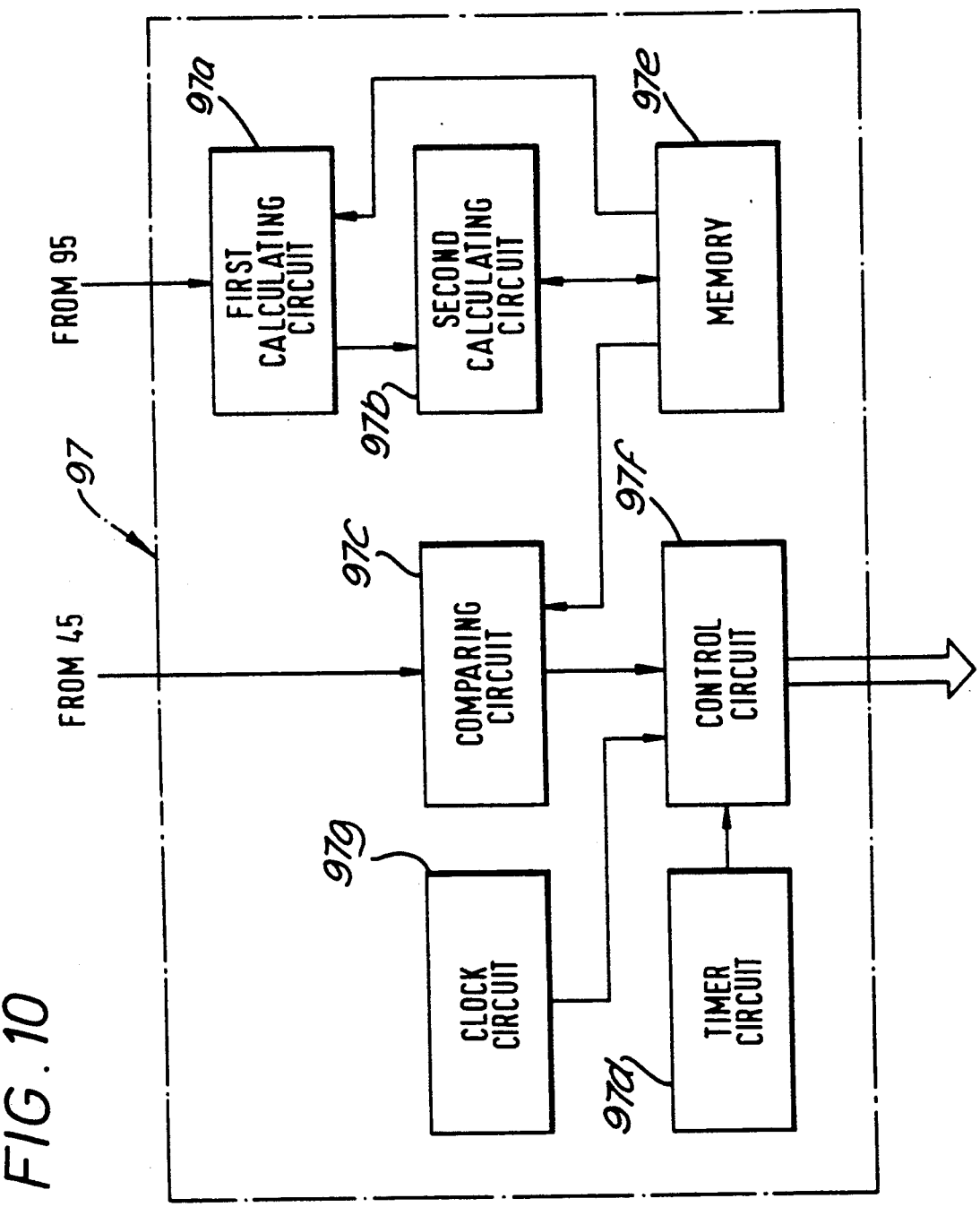
FIG. 10 is a block diagram of the control section shown in FIG. 9.
Figure 11:
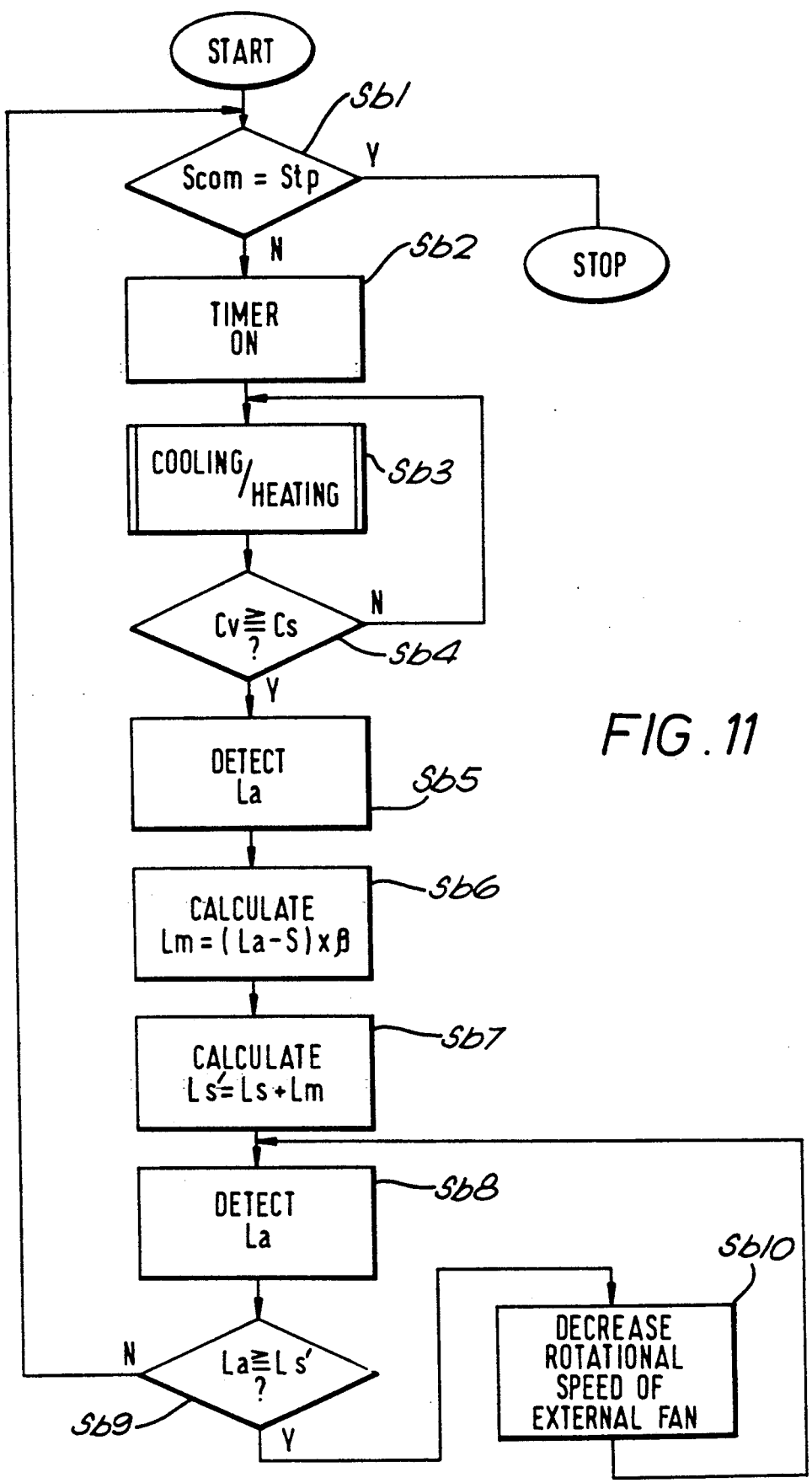
FIG. 11 is a flow chart of the control operation of the air conditioning apparatus shown in FIG. 9.

As shown in FIG. 10, control section 97 includes a first calculating circuit 97a, a second calculating circuit 97b, a comparing circuit 97c, a timer circuit 97d, a memory 97e and a control circuit 97f. However, control section 97 may include a microcomputer and its peripheral circuit to perform the audible sound level control operation and the entire heating/cooling operation of air conditioning apparatus 21.

As shown in FIG. 10, the actual light value (La) detected by photo sensor 95 is input to first calculating circuit 97a to calculate a sound level modifying value (Lm). The sound level modifying value (Lm) is calculated by the following equation:

$$Lm = (La - S) \times \beta \qquad (E1)$$

Wherein S is a threshold value between daytime and nighttime, and $\beta$ is a compensating coefficient (positive value).

The value $\beta$ may be determined as a function of lightness. Both values S and $\beta$ are previously stored in memory 97e.

The sound level modifying value (Lm) is added to a predetermined sound value (Ls) stored in memory 97e in second calculating circuit 97b to output a modified sound value (Ls'). The modified sound value (Ls') is stored in memory 97e.

In the above-described first and second calculations, if the actual ambient light value (La) of the outside of the house detected by photo-sensor 95 is greater than threshold value S, the sound level modifying value (Lm) is a positive value and the current time is automatically identified as a daytime. Thus, the predetermined sound value (Ls) is increased. Otherwise, the sound level modifying value (Lm) is a negative value and the current time is automatically identified as a nighttime. Thus, the predetermined sound value (Ls) is decreased. This is because the background audible sound value at daytime is generally greater than that at nighttime.

In comparing circuit 97c, the actual audible sound value (La) detected by sound sensor 45 is compared with the modified sound value (Ls'). Based on the comparison result in comparing circuit 97c, control circuit 97f controls the rotational speed of external fan device 33 or compressor 23. At this time, the rotational speed of both of external fan device 33 and compressor 23 may be controlled by control circuit 97f. The above-described audible sound level control operation is started after timer circuit 97d has measured a prescribed time period.

The operation of the air conditioning apparatus of the third embodiment will be described with reference to FIG. 11. When an operation command signal (Scom) is fed from a remote controller (not shown) to air conditioning unit 93 in a conventional manner, e.g., an infrared light modulated by an operation command signal, the operation command signal (Scom) is compared with a stop command signal (Stp) in step Sb1. If the operation command signal (Scom) is equal to the stop command signal (Stp), the YES-path is taken, and the operation of air conditioning apparatus 21 stops. Otherwise, the NO-path is taken. In step Sb2, timer 97d begins counting. In step Sb3, air conditioning apparatus 21 carries out a cooling/heating operation based on the operation command signal (Scom). If a count value (Cv) of timer 97d achieves a prescribed value (Cs) in step Sb4, the YES-path is taken. Otherwise, the NO-path is taken and the above-described step Sb3 is re-executed until timer 97d achieves the prescribed value (Cs). When the YES-path is taken in step Sb4, ambient light at the outside of the house is detected by photo-sensor 95 (step Sb5). The sound level modifying value (Lm) is calculated by the above-described equation (E1) in step Sb6. The modified sound value (Ls') is calculated by adding the sound level modifying value (Lm) to the predetermined sound value (Ls) in step Sb7. In step Sb8, the actual audible sound value (La) at the location of refrigerating circuit unit 91 is detected by sound sensor 45. In step Sb9, the actual audible sound value (La) is compared with the modified sound value (Ls'). If the actual audible sound value (La) is greater than the modified sound value (Ls'), the YES-path is taken. The rotational speed of external fan device 33 is decreased by a prescribed value in step Sb10 and the above-described steps Sb8, Sb9 and Sb10 are repeatedly executed until the actual audible sound value (La) is smaller than the modified sound value (Ls'). If the actual audible sound value (La) is smaller than the modified sound value (Ls') in step Sb9, the NO-path is taken and the above-described steps Sb1, Sb2, Sb3, Sb4, Sb5, Sb6, Sb7, Sb8 and Sb9 are re-executed.

With the above-described third embodiment, since the predetermined sound value (Ls) is modified according to the detection results of photo-sensor 95, the audible sound radiated from refrigerating circuit unit 91 can be effectively reduced in accordance with changes in the ambient light at the outside of the house. In daytime, since the background audible sound value (Nb) at the outside of the house is generally high, the modified sound value (Ls') also is high, as compared with the predetermined sound value (Ls). In nighttime, since the background audible sound value (Nb) at the outside of the house is low, as compared with daytime, the modified sound value (Ls') is also low. Thus, the audible sound radiated from refrigerating circuit unit 91 is reduced during the nighttime, as compared with the daytime.

In the above-described third embodiment, the rotational speed of external fan device 33 is decreased when the actual audible sound value (La) is smaller than the modified sound value (Ls'). However, the rotational speed of compressor 23 may be decreased instead of that of external fan device 33, or the rotational speed of both compressor 23 and external fan device 33 may be decreased. The cooling/heating operation of air conditioning apparatus 21 is carried out until timer 97d achieves the prescribed value (Cs). However, the cooling/heating operation of air conditioning apparatus 21 may be carried out until the actual room temperature reaches a modified desired room temperature, which is determined by subtracting a predetermined value, e.g., 3 or 5, from a desired room temperature set by the occupant.

As shown in FIG. 10, a clock circuit 97g properly provided in the microcomputer may be used to determine the daytime and nighttime, instead of photo-sensor 95. The daytime period is determined as, e.g., from 8 a.m. to 7 p.m., and is previously stored in memory 97c. A fixed sound level modifying value (Lm') is also stored memory 97e previously. Thus, the Output of clock circuit 97g is compared with the daytime period. If the output of clock circuit 97g is within the daytime period, the fixed sound level modifying value (Lm') is added to the predetermined sound value (Ls). Otherwise, the fixed sound level modifying value (Lm') is subtracted from the predetermined sound value (Ls).

Figure 12:
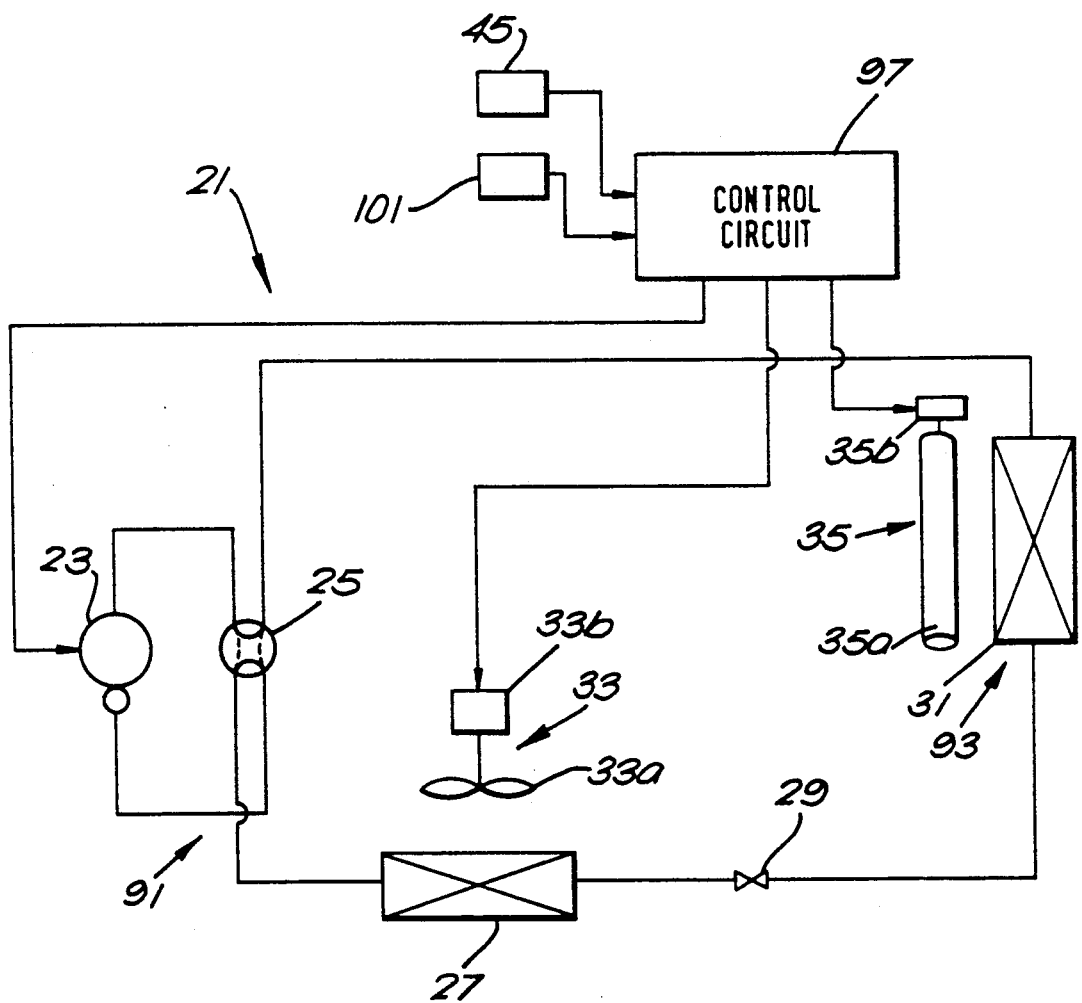
FIG. 12 is a circuit diagram of air conditioning apparatus of a fourth embodiment of the present invention.
Figure 13:
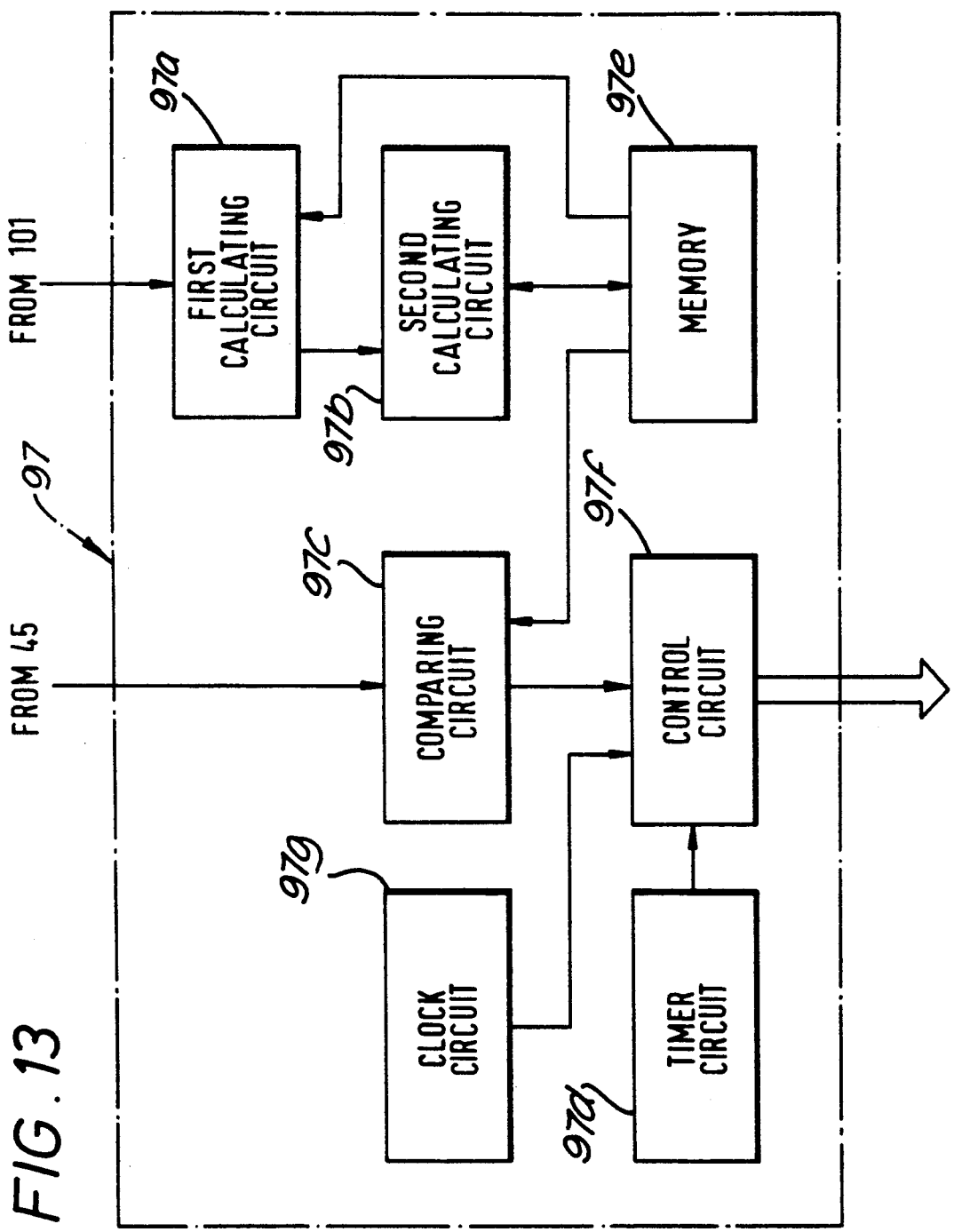
FIG. 13 is a block diagram of the control section of the air conditioning apparatus shown in FIG. 12.
Figure 14:
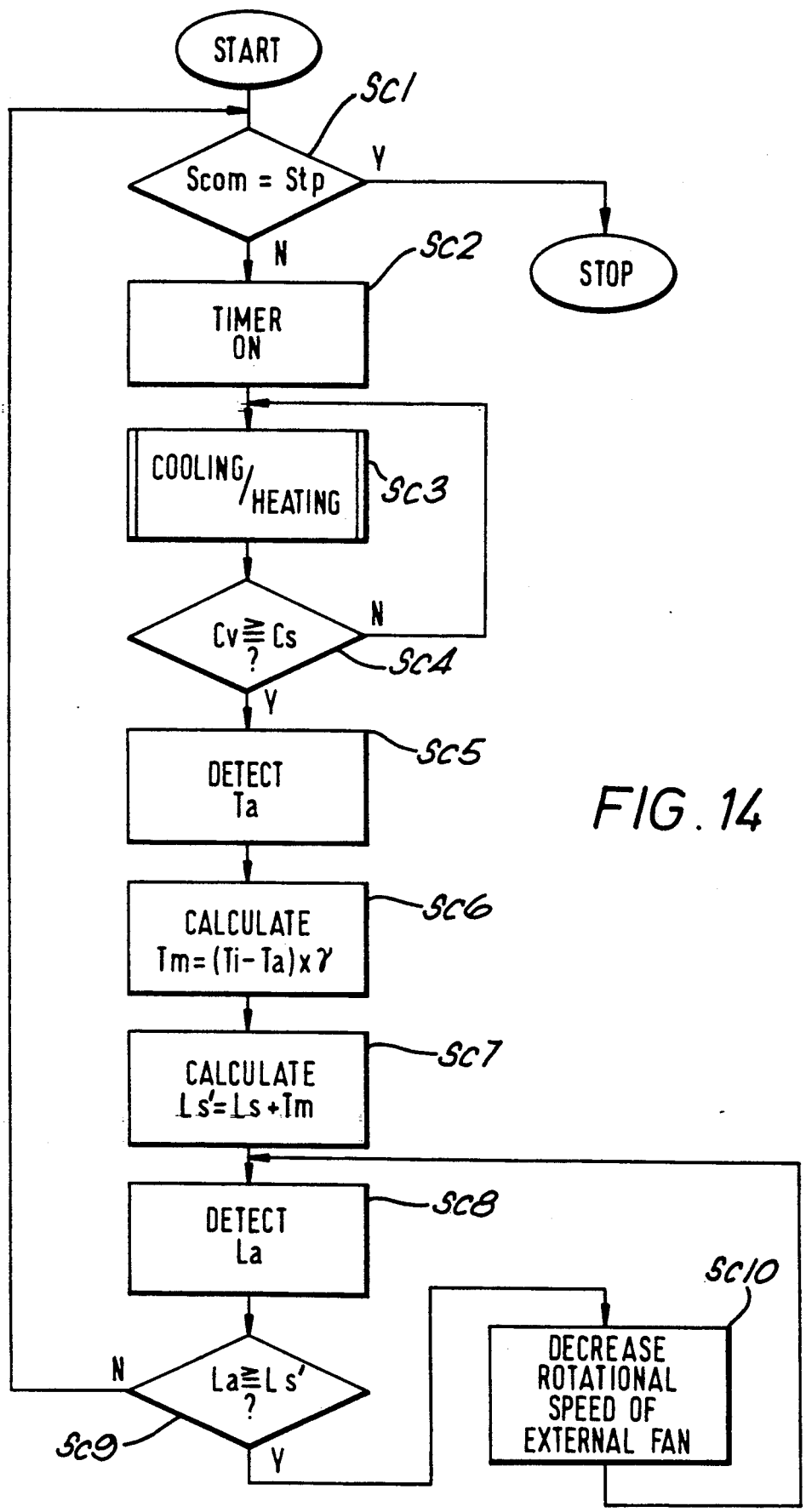
FIG. 14 is a flow chart of the control operation of the air conditioning apparatus shown in FIG. 12.

A fourth embodiment of the present invention will now be described with reference to FIGS. 12, 13 and 14. In this embodiment, an external temperature sensor 101 is used, instead of photo-sensor 95 shown in FIG. 9, to detect the external actual temperature (the outside of the house). Other elements of air conditioning apparatus 21 shown in FIG. 12 are similar to that of air conditioning apparatus 21 shown in FIG. 9. Thus, same numerals are applied to similar element and detailed description thereof are not repeated.

In this embodiment, a sound level modifying value (Tm) is calculated in the first calculating circuit 97a' by the following equation:

$$Tm = (Ti - Ta) \times \gamma \qquad (E2)$$

Wherein Ti is an initial external set temperature, e.g., 20° C., Ta is an external actual temperature, and $\gamma$ is a compensating coefficient (absolute value). The value $\gamma$ may be determined as a function of the external temperature. Both values Ti and $\gamma$ are previously stored in memory 97e shown in FIG. 13. In this embodiment also, the sound level modifying value (Tm) is added to a predetermined sound value (Ls) previously stored in memory 97e in second calculating circuit 97b to output a modified sound value (Ls'). Modified sound value (Ls') is stored in memory 97e.

According to equation (E2), sound level modifying value (Tm) is a negative value if the external actual temperature (Ta) detected by temperature sensor 101 is greater than the initial external set temperature (Ti). Otherwise, sound level modifying value (Tm) is a positive value. Thus, in general, modified sound value (Ls') is increased from the predetermined sound value (Ls) when the external actual temperature (Ta) is low, e.g, in winter, and modified sound value (Ls') is decreased from the predetermined sound value (Ls) when the external actual temperature (Ta) is high, e.g., in summer. This is because doors or windows of neighboring houses may have been opened when the external actual temperature is high. Otherwise, doors or windows of neighboring houses may have been closed. The modification to the predetermined sound value (Ls) in this embodiment is based on the above-described estimation.

In comparing circuit 97c, the actual audible sound value (La) detected by sound sensor 45 is compared with the modified sound value (Lm). Based on this comparison result, control circuit 97f controls the rotational speed of external fan device 33 or compressor 23. In this case, the rotational speed of both of external fan device 33 and compressor 23 may be controlled by control circuit 97f. The above-described audible sound control operation is started after timer circuit 97d has measured a prescribed time period.

The operation of the above-described fourth embodiment will be described with reference to FIG. 14. When an operation command signal (Scom) is fed from a remote controller (not shown) to air conditioning unit 93, the operation command signal (Scom) is compared with a stop command signal (Stp) in step Sc1. If the operation command signal (Scom) is equal to the stop command signal (Stp), the YES-path is taken and the operation of air conditioning apparatus 21 stops. Otherwise, the NO-path is taken. In step Sc2, timer 97d shown in FIG. 13 begins counting. In step Sc3, air conditioning apparatus 21 carries out a cooling/heating operation based on the operation command signal (scom). If a count value (Cv) of timer 97d achieves a prescribed value (Cs) in step Sc4, the YES-path is taken. Otherwise, the NO-path is taken and the above-described step Sc3 is re-executed until timer 97d achieves the prescribed value (Cs).

When the YES-path is taken in step Sc4, the external actual temperature (Ta) is detected by temperature sensor 101 (step Sc5). The sound level modifying value (Tm) is calculated by the equation (E2) in step Sc6. The modified sound value (Ls') is calculated by adding the sound level modifying value (Tm) to the predetermined sound value (Ls) in step Sc7. In step Sc8, actual audible sound value (La) at the location of refrigerating circuit unit 91 is detected by sound sensor 45 at a regular interval. In step Sc9, the actual audible sound value (La) is compared with the modified sound value (Ls'). If the actual audible sound value (La) is greater than the modified sound value (Ls'), the YES-path is taken. The rotational speed of external fan device 33 is decreased by a prescribed value in step Sc10 and the above-described steps Sc8, Sc9 and Sc10 are repeatedly executed until the actual audible sound value (La) is smaller than the modified sound value (Ls'). Otherwise, the NO-path is taken in step Sc9 and the above-described steps Sc1, Sc2, Sc3, Sc4, Sc5, Sc6, Sc7 Sc8 and Sc9 are re-executed.

With the above-described fourth-embodiment, since a predetermined sound value (Ls) is modified based on the detection results of the external temperature sensor 101, audible sound radiated from the refrigerating circuit unit 91 to neighboring houses can be effectively reduced in accordance with changes in the external temperature.

In the above-described fourth embodiment, the rotational speed of external fan device 33 is decreased when the actual audible sound value (La) is smaller than the modified sound value (Ls'). However, the rotational speed of compressor 23 may be decreased instead of that of external fan device 33, or the rotational speed of both compressor 23 and external fan device 33 may be decreased. The cooling/heating operation of air conditioning apparatus 21 is carried out until timer 97d achieves the prescribed value (Cs). However, the cooling/heating operation of air conditioning apparatus 21 may be carried out until the actual actual room temperature detected by a room temperature sensor (not shown) reaches a modified desired room temperature which is determined by subtracting a predetermined value, e.g., 3 or 5, from a desired room temperature. As shown in FIG. 13, a clock circuit 97g may be used to determine seasons, instead of temperature sensor 101. A winter period and a summer period are previously determined and individually stored in memory 97e. A fixed sound level modifying value (Tm') is also stored in memory 97e previously. Thus, the output of clock circuit 97g is compared with the winter period and the summer period. If the output of clock circuit 97g is within the winter period, the fixed sound level modifying value (Tm') is added to the predetermined sound value (Ls). If the output of clock circuit 97g is within the summer period, the fixed sound level modifying value (Tm') is subtracted from the predetermined sound value (Ls). In addition, if the output of clock circuit 97g indicates it is neither winter or summer, the predetermined sound value (Ls) may be used to control audible sound radiated from refrigerating circuit unit 91.

The present invention has been described with respect to specific embodiments. However, other embodiments based on the principles of the present invention should be obvious to those of ordinary skill in the art. Such embodiments are intended to the covered by the claims.

What is claimed is:
1. An air conditioning apparatus comprising:
means for conditioning air circulating in a closed space, the conditioning means radiating a variable level of audible sound during its operation;
sound sensor means for detecting an actual audible sound value (Na) including the audible sound value from the conditioning means while the conditioning means is operated and a background audible sound value (Nb) which is a sound value when the conditioning means is stopped;
memory means for previously storing a predetermined audible sound value (Ns);

means for modifying the predetermined audible sound value to output a modified audible sound value (Ns');

means for comparing the actual audible sound value (Na) with one of the predetermined audible sound value (Ns) and the modified audible sound value (Ns'); and control means for reducing the level of the audible sound from the conditioning means when the actual audible sound value is greater than one of the predetermined audible sound value and the modified audible sound value.

2. An apparatus according to claim 1, wherein the conditioning means includes a refrigerating circuit unit having a compressor and an external fan device to carry out a refrigerating cycle operation wherein one of the condensation and the evaporation of refrigerant is executed, the compressor and the external fan device radiating audible sound proportional to the rotational speed thereof, the control means including means for decreasing the rotational speed of at least one of the compressor and the external fan device until the actual audible sound value (Na) is smaller than one of the predetermined audible sound value (Ns) and the modified audible sound value (Ns').

3. An apparatus according to claim 2 further including timer means for measuring the operation period of the refrigerating circuit unit, the operation of the decreasing means being executed when the timer means has achieved a prescribed value.

4. An apparatus according to claim 2, wherein the modifying means includes photo-sensor means for outputting an external light value (La) responding to changes in the external light.

5. An apparatus according to claim 4 further including first calculating means for calculating a sound level modifying value (Lm) by the following equation:

$$Lm = (La - S) \times \beta$$

wherein S is a threshold value, and $\beta$ is a compensating coefficient (positive value), the modifying means including second calculating means for adding the sound level modifying value (Lm) to the predetermined audible sound value (Ns) to output the modified audible sound value (Ns').

6. An apparatus according to claim 2, wherein the modifying means includes temperature sensor means for outputting an external temperature value (Ta) responding to changes in the external actual temperature.

7. An apparatus according to claim 6 further including first calculating means for calculating a sound level modifying value (Tm) by the following equation:

$$Tm = (Ti - Ta) \times \gamma$$

wherein Ti is a prescribed initial external set temperature value, and $\gamma$ is a compensating coefficient (absolute value), the modifying means including second calculating means for adding the sound level modifying value (Tm) to the predetermined audible sound value (Ns) to output the modified audible sound value (Ns').

8. An apparatus according to claim 2, wherein the modifying means includes clock means for outputting current time, the memory means storing a prescribed time range and a fixed sound level modifying value (Tm'), the modifying means including calculating means for adding the fixed sound level modifying value to the predetermined audible sound value (Ns) to output the modified audible sound value (Ns') when the current time is within the prescribed time range.

9. An air conditioning apparatus for conditioning air, comprising:

an air conditioning unit disposed inside a closed space for circulating the conditioned air in the closed space;

a refrigerating circuit unit disposed outside the closed space for carrying out a refrigerating cycle operation wherein one of the evaporation and the condensation of refrigerant is performed, the refrigerating circuit unit including a compressor and an external fan device radiating an audible sound proportional to the rotational speed of the compressor and the external fan device;

sound sensor disposed outside the closed space for detecting an actual audible sound value (Na) including the audible sound value from the compressor and the external fan device and a background audible sound value (Nb) which is a sound value when the compressor and the external fan device is stopped;

memory means for previously storing a predetermined audible sound value (Ns);

means for modifying the predetermined audible sound value to output a modified audible sound value (Ns');

means for comparing the actual audible sound value (Na) with one of the predetermined audible sound value (Ns) and the modified audible sound value (Ns'); and control means for decreasing the rotational speed of at least one of the compressor and the external fan device until the actual audible sound value (Na) is smaller than one of the predetermined audible sound value (Ns) and the modified audible sound value (Ns').

10. An air conditioning apparatus comprising:

means for conditioning air circulating in a closed space, the conditioning means radiating a variable level of audible sound during its operation;

sound sensor means for detecting an actual audible sound value (Na) including the audible sound value from the conditioning means while the conditioning means is operated and a background audible sound value (Nb) which is a sound value while the conditioning means is stopped, the sensor means also detecting the background audible sound value when the air conditioning means is stopped;

memory means for previously storing a predetermined audible sound value (Ns) and a predetermined sound level modifying value $\alpha$;

means for modifying the background audible sound value (Nb) detected by the sound sensor means to output a modified audible sound value (Ns');

means for comparing the actual audible sound value (Na) with one of the predetermined audible sound value (Ns) and the modified audible sound value (Ns'); and control means for reducing the level of the audible sound from the conditioning means when the actual audible sound value is greater than one of the predetermined audible sound value and the modified audible sound value.

11. An apparatus according to claim 10, wherein the modifying means includes a manual noise level set means for setting the operation of the modifying means, the predetermined sound level modifying value α being added to the background audible sound value (Nb) by the modifying means when the manual noise level set means is operated.

12. An apparatus according to claim 11, wherein the conditioning means includes an air conditioning unit having an internal fan device to carry out the circulation of conditioned air in the closed space, the internal fan device radiating audible sound proportional to the rotational speed thereof, the control means including means for decreasing the rotational speed of the internal fan device until the actual audible sound value (Na) is smaller than one of the predetermined audible sound value (Ns) and the modified audible sound value (Ns').

* * * * *